I. MYERS.

Apparatus for Manufacturing Sugar, Wine, and Oil from Sorghum.

No. 47,321.

Patented April 18, 1865.

WITNESSES
P Franklin Raynor
John C Parker

INVENTOR
Isaac Myers

UNITED STATES PATENT OFFICE.

ISAAC MYERS, OF PISGAH, OHIO.

IMPROVED APPARATUS FOR MANUFACTURING SUGAR, WINE, AND OIL FROM SORGHUM.

Specification forming part of Letters Patent No. 47,321, dated April 18, 1865.

*To all whom it may concern:*

Be it known that I, ISAAC MYERS, of Pisgah, county of Butler, and State of Ohio, have invented a new and Improved Mode of Manufacturing Molasses, Sugar, Wine, and Oil from Sorghum; and I do hereby declare the following to be an exact description thereof, reference being had to the accompanying drawings, and to the letters of reference marked thereon, making a part of this specification.

The nature of my invention consists in the arrangement, construction, and combination of an oblong-shaped furnace with an adjustable molasses-pan, sugar and finishing pan, boiling-water pan, and steam-condenser.

Figure 1:
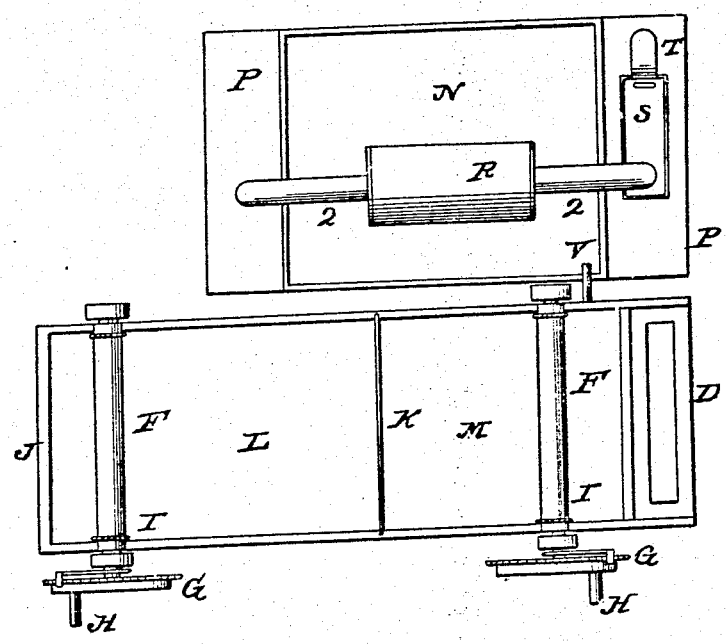
Figure 2:
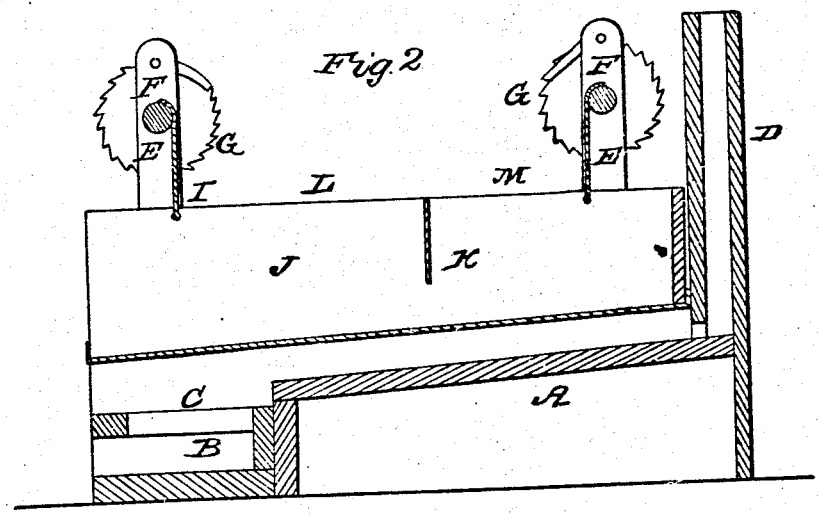

Figure 1 represents a top view of the invention combined. Fig. 2 represents a side elevation showing the furnace and molasses-pan.

A represents the furnace, made of masonry, having its fire-place B with grate C and the top of the furnace incline shape and the chimney D in the rear. On each side of the furnace are two upright posts, E E, and near the tops of the posts are two windlasses or revolving shafts, F, and on the one end of each shaft is a dog and ratchet-wheel, G, and crank H, for the purpose of winding up the four ropes I, that are attached to each corner of the molasses-pan J to adjust the pan. The molasses-pan J is oblong-shaped (corresponding with the shape of the furnace,) having an incline-shaped bottom and a partition, K, near the center, the partition not extending to the bottom, but open in a curve below for the purpose of allowing the molasses, while boiling, to pass from one apartment, L, to the other apartment, M, the partition being for the purpose of skimming against, so as to skim off the green skimmings from the top of the molasses, and with this furnace and a good fire the green skimmings can all be taken off in about half an hour. After the skimmings have all been skimmed off with hand-skimmers the oil then begins to collect on top of the molasses in the smaller apartment M near the chimney. I then skim off the oil, which I throw into a separate tub or cask to save it. In case I want to make wine, I do not skim off the oil, but, having skimmed off all the green skimmings that have reduced the juice then to about half its original quantity, I then pour this juice off into a cask or barrel and allow the juice to remain until it is about milk warm. It is then put through an ordinary fermenting process, and becomes an excellent drinking beverage, that I call "pure sorghum-wine," unmixed with any other liquor.

In making my molasses I keep skimming off all the green skimmings and likewise the oil until the pure white scum or foam is seen, when there is no longer any appearance of green skimmings or oil, and I allow the white skimming or foam on top to remain; and if I find my fire too hot I regulate the pan and prevent the molasses from burning by raising and lowering either or both ends of the pan J by turning the crank H, which winds up the ropes, and by which I adjust and raise or lower the pan J. When the juice has been boiled to the proper consistency as molasses, I then draw it off by a faucet, V, by raising one end of the pan J and letting the molasses run into the adjoining finishing-pan N at the one side of the furnace. This finishing-pan N rests in a square boiler, P, containing boiling water, that is kept heated by an ordinary small iron pipe or flue intended to be connected with the furnace-chimney D. The boiling-water pan P has a pipe, Q, and a condensing-cylinder, R, at top leading to the opposite end of the pan into a water-chamber, S, that is kept filled with cold water through an adjustable gate, T, to let on or shut off the water as required. The molasses is thus kept boiling without burning until it is finished, when I remove it as good molasses; but in case I desire the sugar, I continue the boiling until the molasses granulates and becomes an excellent sugar and without burning.

What I claim as my invention, and desire to secure by Letters Patent, is—

The arrangement, construction, and combination of the oblong furnace A, adjustable molasses-pan J, finishing-pan N, boiling-water pan P, with its steam-condenser R, all as herein described, and for the purposes herein set forth.

ISAAC MYERS.

Witnesses:
J. FRANKLIN REIGART,
JOHN S. HOLLINSGHEAD.